(12) United States Patent  
Chi

(10) Patent No.: US 9,085,885 B2
(45) Date of Patent: Jul. 21, 2015

(54) FABRICATED MOST WATER-SAVING TOILET MADE OF NOVEL THERMOPLASTIC RESIN COMPOUND MATERIAL AND A PREPARATION METHOD THEREOF

(75) Inventor: Liqun Chi, Shanghai (CN)

(73) Assignees: SHANGHAI HUDA INVESTMENT & DEVELOPMENT CO., LTD. (CN); QINGHAIXIWANG HI-TECH & MATERIAL CO., LTD. (CN)

( * ) Notice: Subject to any disclaimer, the term of this patent is extended or adjusted under 35 U.S.C. 154(b) by 846 days.

(21) Appl. No.: 13/332,882

(22) Filed: Dec. 21, 2011

(65) Prior Publication Data

US 2012/0260415 A1 Oct. 18, 2012

(51) Int. Cl.
| | |
|---|---|
| *E03D 11/02* | (2006.01) |
| *B29L 31/00* | (2006.01) |
| *B29B 9/12* | (2006.01) |
| *C08L 23/10* | (2006.01) |
| *C08L 51/06* | (2006.01) |

(52) U.S. Cl.
CPC . *E03D 11/02* (2013.01); *B29B 9/12* (2013.01); *B29L 2031/7694* (2013.01); *C08L 23/10* (2013.01); *C08L 51/06* (2013.01); *E03D 2201/30* (2013.01); *Y10T 29/4998* (2015.01)

(58) Field of Classification Search
CPC ....................................................... E03D 11/02
USPC ...................................................... 4/300–442
See application file for complete search history.

(56) References Cited

U.S. PATENT DOCUMENTS

| | | | | |
|---|---|---|---|---|
| 3,060,452 | A * | 10/1962 | Durdy | 4/424 |
| 3,212,106 | A * | 10/1965 | Noel | 4/421 |
| 4,987,616 | A * | 1/1991 | Ament | 4/421 |
| 8,214,930 | B2 * | 7/2012 | Azodi | 4/213 |
| 8,607,368 | B2 * | 12/2013 | Huang et al. | 4/252.1 |
| 2009/0320196 | A1 * | 12/2009 | Huang et al. | 4/252.1 |
| 2012/0023650 | A1 * | 2/2012 | Azodi | 4/211 |
| 2014/0059755 | A1 * | 3/2014 | Garrels et al. | 4/363 |

* cited by examiner

*Primary Examiner* — Lori Baker
(74) *Attorney, Agent, or Firm* — Ostrolenk Faber LLP

(57) ABSTRACT

A water-saving toilet is made of a thermoplastic resin compound material. The material includes inorganic stuffing provided by an injection technique and includes a main body with a water outlet in the lower part and a flushing water pipe outlet in side wall of the water outlet, a water tank with a cavity at the bottom which is provided with a main pipe opening and a flushing pipe inlet opposite the water tank and communicating with the main body by the main pipe opening, a flushing pipe and a siphon pipe the upper end of which including a water inlet connected with the water outlet. A method of producing the toilet, featuring easily available and sufficient raw material, simple operation, high production efficiency, low energy consumption and environment friendly property is also provided. The toilet has fine appearance, is self-cleaning, water saving and smooth flushing.

12 Claims, 1 Drawing Sheet

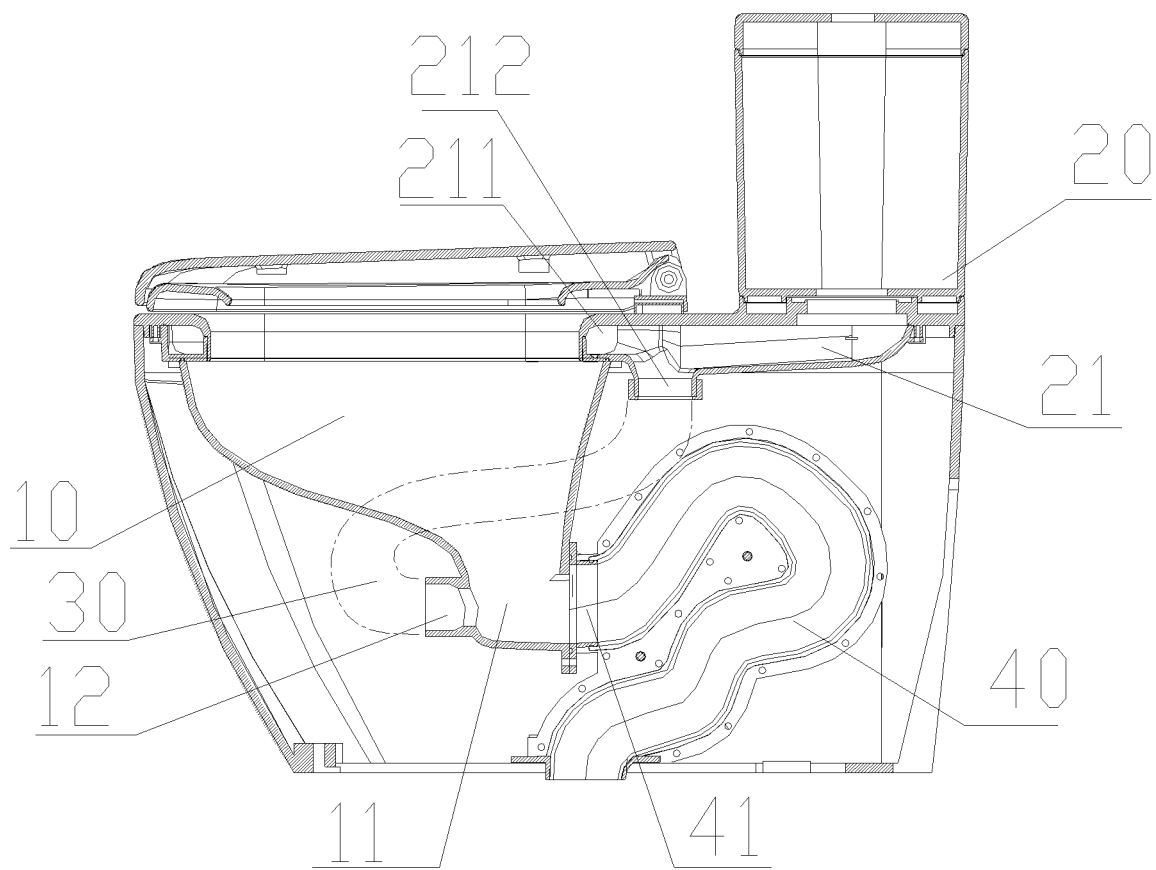

FABRICATED MOST WATER-SAVING TOILET MADE OF NOVEL THERMOPLASTIC RESIN COMPOUND MATERIAL AND A PREPARATION METHOD THEREOF

CROSS-REFERENCE TO RELATED APPLICATIONS

The present application claims priority from Chinese application CN201110090758.5 filed on Apr. 12, 2011, the content of which is hereby incorporated by reference into this application.

BACKGROUND

1. Field of the Disclosure

The present invention relates to a sanitary ware and particularly to a 2 L or 3 L fabricated water-saving toilet made of novel thermoplastic resin compound material and a preparation method thereof. The toilet efficiently saves water.

2. Related Art

Currently, most toilets in the market are made by ceramics, that is, sintering china clay. The clay is made into the expected shape, fired, glazed and sintered. The sintering process requires a quantity of coal or natural gas and causes massive carbon emission and energy consumption, resulting in air pollution. The uneven temperature during sintering may crack or deform the products, resulting in a mass of wastes, large energy consumption, secondary pollution and high cost. Furthermore, resources of clay are decreasing, which means no ceramic sanitary appliance can be produced when the clay is used up. Therefore, the ceramic sanitary appliance industry is unsustainable. Additionally, ceramic greatly deforms during sintering, so the inner diameter of the flushing pipe may be uneven and the inner surface may be rough, hindering water flow and consequently requiring more flushing water and may increase the possibility of blockage. Moreover, the thick ceramic material means smaller cavity volume of the toilet of the same total volume. This is another cause of blockage.

Toilets made of other compound materials on the market, such as acrylic, are unsatisfying in impact resistance, strength, self-cleaning property, practical applicability, appearance, texture or quality.

SUMMARY

The present invention is to provide a fabricated water-saving toilet made of novel thermoplastic resin compound material. The toilet has a flushing pipe with a smooth inner surface and an even inner diameter which is larger than that of other toilets of the same size and makes the flushing process smooth. The toilet also makes the best of siphon to save water and prevent blockage. Moreover, the toilet is made of a compound material containing inorganic stuffing and thermoplastic resin by injection molding, so it feels like ceramic and has smaller weight, better self-cleaning property, is practical and has good look and high class.

To reach the goals above, the present invention provides a fabricated water-saving toilet made of novel thermoplastic resin compound material containing inorganic stuffing and thermoplastic resin by injection molding. The toilet comprises:

a main body, a water outlet of the main body is set in the lower part of the main body, and a flushing water pipe outlet is set in the side wall of the main body's water outlet;

a water tank, a cavity at the bottom of the water tank, the cavity being integrated and in communication with the water tank, a main pipe opening and a flushing pipe inlet are set on the cavity in the far end from the water tank, the cavity is in communication with the main body by the main pipe opening;

a flushing pipe, the ends of which are connected with the flushing pipe inlet and the flushing water pipe outlet respectively;

and a siphon pipe, the top of the siphon pipe being higher than the main body's water outlet, a water inlet is set in the upper end of the siphon pipe, and is in communication with the main body's water outlet, the low end of the siphon pipe is connected with a downcomer.

The fabricated water-saving toilet is made of novel thermoplastic resin compound material, the novel thermoplastic resin compound material comprising the following materials by weight percentages:

Inorganic stuffing: 50%-70%,
Polypropylene: 25%-40%,
Maleic anhydride modified polypropylene: 3%-6%,
Titanium dioxide powder: 1%-3%,
And antioxidant: 1%-2.

wherein said inorganic stuffing is modified with stearic acid.

As to the fabricated water-saving toilet made of novel thermoplastic resin compound material mentioned above, said modification is carried out by mixing 1-5% weight percentage of stearic acid and 95-99% weight percentage of stuffing and mixed by a high speed mixer for 15-30 min at 90-100° C. so as to sufficiently mix and collide the stearic acid and stuffing.

As to the fabricated water-saving toilet made of novel thermoplastic resin compound material mentioned above, the inorganic stuffing is wollastonite, or calcium carbonate, or mixture of wollastonite and calcium carbonate.

As to the fabricated water-saving toilet made of novel thermoplastic resin compound material mentioned above, the inner walls of the siphon pipe and flushing pipe are smooth by polishing and painting, so that the flushing process can be smooth and blockage can be prevented.

As to the fabricated water-saving toilet made of novel thermoplastic resin compound material mentioned above, the siphon pipe is shaped as an irregular deep reverse U to give a better siphon force, hence improving the cleaning capability of the toilet.

As to the fabricated water-saving toilet made of novel thermoplastic resin compound material mentioned above, the toilet is formed by connecting the main body, water tank, flushing pipe and siphon pipe, it is convenient in disassembly, cleaning and maintenance, whereas the ceramic toilets are formed in whole by sintering and are difficult to clean and maintain.

As to the water-saving toilet made of novel thermoplastic resin compound material mentioned above, all joints of the toilet are sealed by seal rings to prevent possible water leakage.

The toilet provided by the present invention is made of novel thermoplastic resin compound material which includes inorganic stuffing like natural ore powder, as well as thermoplastic polymers. The materials are adequate and easily available, which can support the sustainable development. The compound material can be injection molded by an injection machine, which results in low energy consumption and high yield. Compared with ceramic products of equivalent strength, products made of the compound material is capable of thinner walls and larger internal diameters of the flushing pipe and siphon pipe, so that the toilet may siphon in a shorter time, hence saving water efficiently.

The present invention also provides a preparation method of the water-saving toilet made of novel thermoplastic resin compound material, including the following steps:

Step 1, preparation of compound material granules: mixing polypropylene, maleic modified polypropylene, titanium dioxide powder, stuffing and antioxidant of said weight percentages evenly in a mixer, adding the mixture into a hopper of a double screw extruder, thermally forming the mixture, extruding from extruder to obtain compound material strips, cooling the strips, putting the cooled strips into a granulator to make granules and drying the granules by a oven;

Step 2, production of toilet parts by injection molding: feeding the compound material granules into the charging barrel of an injection machine, melting them, injecting the melt into metal moulds of the main body, water tank, flushing pipe and siphon pipe respectively, injecting 5-10° C. cooling water into cooling water pipes of the metal moulds to solidify the products, opening the moulds and taking out the formed parts;

Step 3: fixedly connecting the parts to make a toilet: fixedly connect the flushing pipe to the flushing pipe inlet and outlet, fixedly connect the upper end of the siphon pipe to the water outlet of the toilet and apply seal rings to every joint to prevent water leakage.

As to the preparation method of the water-saving toilet made of novel thermoplastic resin compound material mentioned above, said Step 3 also includes a step for polishing and painting inner walls of the flushing pipe and siphon pipe before connecting the parts.

Compared with ceramic toilet, the fabricated water-saving toilet made of novel thermoplastic resin compound material is more likely to be free from blockage during the flushing, and the deformation of this product can be better controlled. The toilet is made by an injection process. The moulds of the toilet's parts can be plated and polished, so the parts' surface will be smoother. Painting of the inner surfaces of the pipes before assembly ensures extremely smooth surfaces. The siphon pipes of ceramic toilets are formed by single-side absorption of slurries, in which the inner surface roughness is hard to control. Even some high grade ceramic products whose pipes are treated with glaze filling cannot be free of rough inner surface during sintering due to uneven glazing. Furthermore, the products made by injection are much less deformed than ceramic products. For example, it is easy to control the length tolerance of an 80 cm long product made of compound material within 0.5 mm while it is hard to control the length tolerance of an 80 cm long ceramic product within 1.5 mm. It is obviously that the water-saving toilet made of novel thermoplastic resin compound material is much better than the ceramic toilets in deformation and tolerance.

The water-saving toilet made of novel thermoplastic resin compound material provided by the present invention features easily obtained material, simple operation, high production efficiency, low energy consumption, environment friendly property and sustainable development. The toilet produced by said method requires 3 L water for full flushing and 2 L water for minor flushing while the full flushing water of the products in the market is usually 4.8 L and the national standard is 6 L, showing excellent water saving capacity (saving 1.8 L and 3 L respectively compared with the ordinary products and the national standard). The toilet provided by the present invention rivals the ceramic toilet in impact resistance and mechanical strength and is delicate, satisfactory in self-cleaning and blockage prevention, smooth in flushing and highly qualified.

BRIEF DESCRIPTION OF THE DRAWINGS

FIG. 1 is the structure sketch of the water-saving toilet made of novel thermoplastic resin compound material of the invention.

DETAILED DESCRIPTION OF THE EMBODIMENTS

The technical proposal of the present invention is further described with reference to the FIGURE and embodiments.

As shown in FIG. 1, the toilet provided by the present invention comprises a main body 10, a water tank 20, a flushing pipe 30 and a siphon pipe 40.

The main body 10 has a water outlet 11 in its lower part and a flushing water pipe outlet 12 in the side wall of the water outlet 11.

The water tank 20 has a cavity 21 at the bottom, the cavity 21 is in communication with the main body 10 and is integrated in and in communication with the water tank 20, a main pipe opening 211 and a flushing pipe inlet 212 are set on the cavity 21 in the far end away from the water tank 20, the cavity 21 is in communication with the main body 10 by the main pipe opening 211;

The ends of the flushing pipe 30 are connected with the flushing pipe inlet 212 and the flushing water pipe outlet 12 respectively. The flushing pipe inlet 212 is in communication with the flushing water pipe outlet 12 in the side wall of the water outlet 11 by the flushing pipe 30, and accordingly in communication with the siphon pipe 40. The inner wall of the flushing pipe 30 is smooth and non-adhesive due to polishing and painting. The flushing pipe 30 is fixedly connected with the flushing pipe inlet 212 and the flushing water pipe outlet 12 fixedly by flanges and seal rings.

The siphon pipe 40 is shaped as an irregular deep reverse U and the peak of the siphon pipe 40 is higher than the water outlet 11. The upper end of the siphon pipe 40 is provided with a water inlet 41 fixedly connected with the water outlet 11 by flanges and seal rings. The lower end of the siphon pipe 40 is provided with a downcomer (not shown in the FIGURE). The inner wall of the siphon pipe 40 is smooth and non-adhesive due to polishing and painting.

The toilet is formed by connecting the main body 10, the water tank 20, the flushing pipe 30 and the siphon pipe 40 by flanges or other connectors and prevented from water leakage by seal rings. It is convenient in disassembly, cleaning and maintenance whereas the ceramic toilets sintered in whole are inconvenient in disassembly, cleaning and maintenance.

The preparation method of the water-saving toilet made of novel thermoplastic resin compound material is further described in detail below.

In the following embodiments, the calcium carbonate and wollastonite are modified by preprocessing in a high speed mixer by mixing 1.5% weight percentage of stearic acid ($C_{16}H_{32}O_2$, melting point 69.6° C.) and 98.5% weight percentage of calcium carbonate or wollastonite in a high speed mixer at 90-100° C. for 15-30 min so as to sufficiently mix and collide the stearic acid and stuffing. The modified calcium carbonate and wollastonite can be sufficiently blended with polypropylene, which greatly increases the compatibility between the materials and decreases surface oil absorption of calcium carbonate or wollastonite, thereby leading to a much higher ratio of calcium carbonate or wollastonite in the compound material. So, the modified nonmetal thermoplastic compound material has a high filling capacity. The modified nonmetal material with good compatibility and high filling capacity enables the sanitary products made of such material by injection to have good rigidity, high strength, corrosion resistance and a natural stone feel.

| Embodiment 1<br>Based on weight percentage | |
|---|---|
| 1,250-mesh wollastonite powder | 30% |
| 100-mesh wollastonite powder | 20% |
| M700 polypropylene granules | 15% |
| M2600 polypropylene granules | 25% |
| MAH-G-PP maleic anhydride modified polypropylene | 5% |
| CR-834 titanium dioxide powder | 3% |
| Antioxidant 1010 | 2%. |

Step 1, preparation of compound material granules: mixing and stirring the materials according to the formula quantity in the blender sufficiently to evenly distribute the materials, adding the mixture of a necessary amount into the hopper of a double screw extruder through the feeding inlet and bypass feeding inlet, thermally forming the mixture, extruding to compound material strips, cooling the strips to room temperature by a water tank, putting the cooled strips into a granulator to make granules and drying the granules in an oven at 100° C.-120° C. to remove all the moisture;

Step 2, production of toilet parts by injection molding: feeding the dried compound material granules into a charging barrel of an injection machine, melting them, inputting the amount of materials for one product into the control program of the injection machine, activating the injection control program, injecting the melt into metal moulds through the screw rods, namely a piston cylinder injects the melt into the metal moulds of the corresponding parts (the main body, the water tank, the flushing pipe and the siphon pipe) using high pressure, injecting 5-10° C. cooling water into cooling water pipe of the moulds to solidify the products, opening the moulds and taking out the formed parts by manipulators;

Step 3: connecting the parts fixedly to form the toilet: fixing the flushing pipe to the flushing pipe inlet and outlet by flanges, fixing the upper end of the siphon pipe to the water outlet by flanges and sealing the joints with seal rings to prevent water leakage.

The toilet in embodiment 1 looks like marble and shows rigidity and firm feel of natural stone when being knocked. The test results are shown in Tables 1, 2 and 3.

| Embodiment 2<br>Based on weight percentage: | |
|---|---|
| 1,250-mesh wollastonite powder | 40% |
| 325-mesh wollastonite powder | 20% |
| M700 polypropylene granules | 12% |
| M2600 polypropylene granules | 18% |
| MAH-G-PP maleic anhydride modified polypropylene | 5% |
| CR-834 titanium dioxide powder | 3% |
| Antioxidant 1010 | 2%. |

All parts are made using the method in embodiment 1. To further ensure smooth flushing, the inner surfaces of the flushing pipe and siphon pipe are polished and painted to make them smooth and non-adhesive before connecting the parts. All the parts are connected after such process according to the method in embodiment 1.

The toilet in embodiment 2 looks like marble and shows rigidity and firm feel of natural stone when being knocked. The test results are shown in Tables 1, 2 and 3.

| Embodiment 3<br>Based on weight percentage: | |
|---|---|
| 1000-mesh wollastonite powder | 40% |
| 500-mesh calcium carbonate | 20% |
| 100-mesh calcium carbonate | 10% |
| M700 polypropylene granules | 10% |
| M2600 polypropylene granules | 15% |
| MAH-G-PP maleic anhydride modified polypropylene | 3% |
| CR-834 titanium dioxide powder | 1% |
| Antioxidant 1010 | 1%. |

All parts are made by the method in embodiment 1. To further ensure smooth flushing, the inner surfaces of the flushing pipe and siphon pipe are polished and painted to make them smooth and non-adhesive before connecting the parts fixedly. All the parts are connected after such process according to the method in embodiment 1.

The toilet in embodiment 3 looks like marble and shows rigidity and firm feel of natural stone when being knocked. The test results are shown in Tables 1, 2 and 3.

| Embodiment 4<br>Based on weight percentage: | |
|---|---|
| 800-mesh calcium carbonate | 18% |
| 600-mesh calcium carbonate | 26% |
| 80-mesh calcium carbonate | 26% |
| M700 polypropylene granules | 10% |
| M2600 polypropylene granules | 15% |
| MAH-G-PP maleic anhydride modified polypropylene | 3% |
| CR-834 titanium dioxide powder | 1% |
| Antioxidant 1010 | 1%. |

All parts are made by the method in embodiment 1. To further ensure smooth flushing, the inner surfaces of the flushing pipe and siphon pipe are polished and painted to make them smooth and non-adhesive before connecting the parts fixedly. All the parts are connected after such process according to the method in embodiment 1.

The toilet in embodiment 4 looks like marble and shows rigidity and firm feel of natural stone when being knocked. The test results are shown in Tables 1, 2 and 3.

TABLE 1 visual inspection result of the toilets in embodiments 1-4

| Appearance quality | Technical requirements | Embodiment 1 | Embodiment 2 | Embodiment 3 | Embodiment 4 |
|---|---|---|---|---|---|
| Crack | Not allowed | Qualified | Qualified | Qualified | Qualified |
| Wrinkle | Not obvious | Qualified | Qualified | Qualified | Qualified |
| Defect | Not allowed | Qualified | Qualified | Qualified | Qualified |
| White spot | Not obvious | Qualified | Qualified | Qualified | Qualified |
| Mottling | Slight | Qualified | Qualified | Qualified | Qualified |
| Bubble | Slight | Qualified | Qualified | Qualified | Qualified |
| Pit | Slight | Qualified | Qualified | Qualified | Qualified |
| Scratch | Not obvious | Qualified | Qualified | Qualified | Qualified |
| Repair trace | Not obvious | Qualified | Qualified | Qualified | Qualified |
| Concave | Not obvious | Qualified | Qualified | Qualified | Qualified |
| Color difference | Color of the whole set product shall be basically the same | Qualified | Qualified | Qualified | Qualified |
| Impurity | Not obvious | Qualified | Qualified | Qualified | Qualified |

TABLE 2 physical performance test results of the toilets in embodiments 1-4

| Physical properties | Technical requirements | Embodiment 1 | Embodiment 2 | Embodiment 3 | Embodiment 4 |
|---|---|---|---|---|---|
| Roughness, ‰ | ≤4 | 1.6 | 1.3 | 1.4 | 1.4 |
| Load resistance | No crack on surface | Qualified | Qualified | Qualified | Qualified |
| Impact resistance | No crack on surface | Qualified | Qualified | Qualified | Qualified |
| Water absorption, % | ≤0.5 | 0.42 | 0.4 | 0.38 | 0.4 |
| Stain resistance | No obvious color change | Qualified | Qualified | Qualified | Qualified |

TABLE 3 flushing capacity test results of the toilets in embodiments 1-4

| Flushing capacity | Technical requirements | | Embodiment 1 | Embodiment 2 | Embodiment 3 | Embodiment 4 |
|---|---|---|---|---|---|---|
| Full flushing mm | Total residual ink line after flushing not longer than 50 | | 0 | 0 | 0 | 0 |
| | Total residual ink line after flushing not longer than 13 | | 0 | 0 | 0 | 0 |
| Minor flushing mm | Total residual ink line after flushing not longer than 50 | | 0 | 0 | 0 | 0 |
| | Total residual ink line after flushing not longer than 13 | | 0 | 0 | 0 | 0 |
| Ball discharge | Average balls of three tests not less than 85 | | 90 | 100 | 95 | 98 |
| Granule discharge | Average visible polyethylene granules in the trap of three discharge not more than 125 (5%) | | 18 | 10 | 12 | 13 |
| | Average visible nylon granules of three tests not more than 5 | | 0 | 0 | 0 | 0 |
| Sewage replacement | Dilution rate of full flushing not lower than 100 | | >100 | >100 | >100 | >100 |
| | Dilution rate of minor flushing not lower than 17 | | >17 | >17 | >17 | >17 |
| Water seal recovery capacity after full flushing | Not less than 50 | 0.55 MPa | 60 | 60 | 60 | 60 |
| | | 0.14 MPa | 60 | 60 | 60 | 60 |
| | | 0.35 MPa | 60 | 60 | 60 | 60 |
| Water seal recovery capacity after minor flushing | Not less than 50 | 0.55 MPa | 60 | 60 | 60 | 60 |
| | | 0.14 MPa | 60 | 60 | 60 | 60 |
| | | 0.35 MPa | 60 | 60 | 60 | 60 |
| Spatter resistance | No spatter on the plate when ignoring water drop of diameter less than 5 mm or mist | | Qualified | Qualified | Qualified | Qualified |

The results in Tables 1, 2 and 3 show that the toilet is flawless, delicate, smooth and has excellent physical property, good water-resistance, surface dirt-resistance, high rigidity, good impact resistance, good abrasion resistance and flushing and cleaning capacity and greatly saves water.

The flushing water amount is finally controlled at 3 L for full flushing and 2 L for minor flushing based on a good deal of tests whereas the full flushing water of ordinary products in the market is usually 4.8 L and the national standard is 6 L (saving 1.8 L and 3 L respectively compared with the existing products and the national standard). Assuming that each person in a family of three goes to the toilet six times a day, the product of the invention will save 12,000 liters of water per year compared with toilets requiring 4.8 L water and saves 20,000 liters of water per year compared to toilets of national standard requiring 6 L water.

Having fully described preferred embodiments of the invention, those skilled in the art will immediately appreciate, given the teachings herein, that numerous alternatives and equivalents exist.

What is claimed is:

1. A water-saving toilet made of a thermoplastic resin compound including inorganic stuffing comprising:
   a main body including a water outlet set in a lower part of the main body, and a flushing water pipe outlet set in a side wall of the water outlet;
   a water tank including a cavity formed at a bottom thereof, a proximal end of the cavity integrated and in communication with the water tank, a main pipe opening and a flushing pipe inlet set in the cavity in a far end thereof spaced away from the proximal end, the cavity in communication with the main body through the main pipe opening;
   a flushing pipe including a first end connected with the flushing pipe inlet of the water tank and a second end connected with the flushing water pipe outlet of the main body; and a siphon pipe positioned such that a top of the siphon pipe is higher than the water outlet of the main body, the siphon pipe including a water inlet set in an upper end of the siphon pipe, and communication with the water outlet of the main body, and a low end of the siphon pipe connected with an outlet.

2. The water-saving toilet of claim 1, wherein the thermoplastic resin compound material comprises the following materials by weight percentage:

Inorganic stuffing 50%-70%,
Polypropylene 25%-40%,
Maleic anhydride modified polypropylene 3%-6%,
Titanium dioxide powder 1%-3%, and
antioxidant 1%-2%,
wherein said inorganic stuffing is modified with stearic acid.

3. The water-saving toilet of claim 2, wherein the inorganic stuffing is modified by mixing 1-5% weight percentage of stearic acid and 95-99% weight percentage of inorganic stuffing at 90-100° C. in a high speed mixer for 15-30 minutes so as to mix the stearic acid and the inorganic stuffing.

4. The water-saving toilet of claim 1, wherein said inorganic stuffing is wollastonite, calciaum carbonate, or a mixture of wollastonite and calcium carbonate.

5. The water-saving toilet of claim 1, wherein said siphon pipe and said flushing pipe include inner walls that are smoothed by polishing and painting.

6. The water-saving toilet of claim 4, wherein said siphon pipe and said flushing pipe include inner walls that are smoothed by polishing and painting.

7. The water-saving toilet of claim 1, wherein said siphon pipe is shaped as an irregular deep reverse U.

8. The water-saving toilet of claim 1, wherein the water-saving toilet is formed by connecting the main body, the water tank, the flushing pipe and the siphon pipe such that the main body, the water tank, the flushing pipe and the siphon are easily disassembled for cleaning and maintenance.

9. The water-saving toilet of claim 7, wherein the water-saving toilet is formed by connecting the main body, the water tank, the flushing pipe and the siphon pipe such that the main body, the water tank, the flushing pipe and the siphon are easily disassembled for cleaning and maintenance.

10. The water-saving toilet of claim 9, wherein all connections of the water-saving toilet formed in connecting the main body, the water tank, the flushing pipe and the siphon pipe are sealed.

11. A method of producing the water-saving toilet of claim 2, comprising:

mixing polypropylene, maleic modified polypropylene, titanium dioxide powder, stuffing and antioxidant evenly in a mixer according to said respective weight percentage thereof, thermally forming the mixture, extruding material strips of the mixture, cooling the material strips, granulating the cooled material strips to make granules, drying the granules in an oven;

feeding the granules into an injection machine, melting the granules, injecting the melted granules into metal moulds in the shape of the main body, water tank, flushing pipe and siphon pipe, respectively, injecting 5-10° C. cooling water into cooling water pipes of the metal moulds to solidify the products, opening the moulds and taking out formed parts;

fixedly connecting the flushing pipe to the flushing pipe inlet and outlet;

fixedly connecting the upper end of the siphon pipe to the water outlet of the toilet; and applying seal rings to every joint where the fixed connecting steps take place to prevent water leakage.

12. The method of producing a water-saving toilet of claim 11, further comprising polishing and painting the inner walls of the flushing pipe and siphon pipe before connecting the flushing pipe to the flushing pipe inlet and outlet and the siphon pipe to the water outlet.

\* \* \* \* \*